(12) United States Patent
Cheng et al.

(10) Patent No.: US 9,077,591 B2
(45) Date of Patent: Jul. 7, 2015

(54) DIAS-DYNAMIC IMPU ASSIGNMENT SERVICE

(75) Inventors: Yi Cheng, Spänga (SE); Luis Barriga, Skarpnäck (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1249 days.

(21) Appl. No.: 12/097,400

(22) PCT Filed: Dec. 13, 2005

(86) PCT No.: PCT/SE2005/001904
§ 371 (c)(1),
(2), (4) Date: Jun. 13, 2008

(87) PCT Pub. No.: WO2007/069942
PCT Pub. Date: Jun. 21, 2007

(65) Prior Publication Data
US 2010/0223339 A1    Sep. 2, 2010

(51) Int. Cl.
*G06F 15/16* (2006.01)
*H04L 29/12* (2006.01)
(Continued)

(52) U.S. Cl.
CPC ......... *H04L 29/1233* (2013.01); *H04L 12/2803* (2013.01); *H04L 12/2809* (2013.01); *H04L 12/2834* (2013.01); *H04L 29/12216* (2013.01); *H04L 61/2007* (2013.01); *H04L 61/25* (2013.01); *H04L 63/0407* (2013.01); *H04L 2012/2845* (2013.01); *H04L 2012/2849* (2013.01); *H04W 4/00* (2013.01); *H04W 8/26* (2013.01); *H04W 60/00* (2013.01); *H04W 76/02* (2013.01); *H04W 88/16* (2013.01); *H04L 65/1016* (2013.01); *H04L 65/1026* (2013.01); *H04L 65/1036* (2013.01)

(58) Field of Classification Search
CPC ............ H04L 65/1036; H04L 65/1026; H04L 61/2007; H04L 61/25; H04L 29/1233
USPC ......................................................... 709/206
See application file for complete search history.

(56) References Cited

U.S. PATENT DOCUMENTS 6,553,404 B2 * 4/2003 Stern .............................. 709/203
6,944,167 B1 * 9/2005 McPherson ................... 370/401
(Continued)

FOREIGN PATENT DOCUMENTS

EP    1432257 B1 *  7/2005
EP    1365620 B1 *  6/2006
(Continued)

*Primary Examiner* — Arvin Eskandarnia
*Assistant Examiner* — Anthony Fabbri

(57) ABSTRACT

A method and arrangement in a multimedia gateway connected to a multimedia service network, for providing access to multimedia services for communication devices connected to a private network. In the multimedia gateway, a communication unit receives a request from a device in the private network for a public identity associated with the multimedia gateway. An identity manager then selects and allocates an associated public identity from a pool of public identities associated with the multimedia gateway which have been predefined as valid in the multimedia service network. The communication unit then registers the device by activating the allocated associated public identity in the multimedia service network. Thereby, the multimedia gateway can establish a multimedia session on behalf of the device, using the allocated associated public identity.

28 Claims, 3 Drawing Sheets

(51) Int. Cl.
*H04L 12/28* (2006.01)
*H04L 29/06* (2006.01)
*H04W 4/00* (2009.01)
*H04W 8/26* (2009.01)
*H04W 60/00* (2009.01)
*H04W 76/02* (2009.01)
*H04W 88/16* (2009.01)

(56) References Cited

U.S. PATENT DOCUMENTS

| | | | |
|---|---|---|---|
| 6,993,038 B2* | 1/2006 | McCann | 370/401 |
| 7,061,887 B2* | 6/2006 | Fan | 370/331 |
| 7,139,841 B1* | 11/2006 | Somasundaram et al. | 709/245 |
| 7,200,662 B2* | 4/2007 | Hasan et al. | 709/226 |
| 7,333,500 B2* | 2/2008 | Roshko | 370/401 |
| 7,583,963 B2* | 9/2009 | Tammi et al. | 455/435.1 |
| 8,755,370 B1* | 6/2014 | Biswas et al. | 370/352 |
| 2001/0042102 A1* | 11/2001 | Inamori et al. | 709/206 |
| 2003/0084130 A1* | 5/2003 | D'Annunzio | 709/220 |
| 2004/0223500 A1* | 11/2004 | Sanderson et al. | 370/395.53 |
| 2005/0055716 A1* | 3/2005 | Louie et al. | 725/58 |
| 2009/0083426 A1* | 3/2009 | Cagenius | 709/227 |
| 2010/0070636 A1* | 3/2010 | Skog et al. | 709/228 |
| 2010/0135279 A1* | 6/2010 | Petersson et al. | 370/352 |
| 2010/0223339 A1* | 9/2010 | Cheng et al. | 709/206 |
| 2011/0026510 A1* | 2/2011 | Matsumura et al. | 370/338 |
| 2011/0167160 A1* | 7/2011 | Murakami et al. | 709/227 |
| 2012/0128006 A1* | 5/2012 | Petersson et al. | 370/401 |

FOREIGN PATENT DOCUMENTS

| | | | |
|---|---|---|---|
| WO | WO 2006/045706 A1 | | 5/2006 |
| WO | WO2006045706 | * | 5/2006 |

* cited by examiner

DIAS-DYNAMIC IMPU ASSIGNMENT SERVICE

TECHNICAL FIELD

The present invention relates generally to a method and arrangement for enabling multimedia communication by means of a multimedia gateway connected to a multimedia service network. Access to multimedia services can then be provided for devices connected to a private network, particularly different types of communication devices in a residential network.

BACKGROUND

Various communication devices are available today that are capable of packet-based multimedia communication using IP (Internet Protocol), such as either fixed or mobile computers and telephones. Multimedia services typically entail transmission of encoded data representing media in different formats and combinations. The term "multimedia" will be used in this description to generally represent any choice of media communicated by using the packet based IP (Internet Protocol) transport technology. Multimedia services involve packet-switched communication of data representing different types of media, such as audio, video, images, text, documents, animations, etc.

A network architecture called "IP Multimedia Subsystem" (IMS) has been developed by the 3$^{rd}$ Generation Partnership Project (3GPP) as an open standard for handling multimedia services and sessions in the packet domain. IMS is a platform for enabling services based on IP transport, more or less independent of the access technology used and not restricted to any specific services. Thus, an IMS network controls multimedia sessions but is not used for the actual transfer of payload data which is routed over access networks and any intermediate transport networks including the Internet.

FIG. 1 is an exemplary schematic illustration of a basic network structure for providing multimedia services by means of an IMS service network. A mobile terminal A is connected to a radio access network 100 and communicates with a fixed terminal B connected to another access network 102, in a communication session S involving one or more multimedia services. There may also be an intermediate backbone network as well, not shown, linking the access networks 100 and 102.

An IMS network 104 is connected to the radio access network 100 and handles the session with respect to terminal A, where networks 100, 104 are typically owned by one operator. In this example, a corresponding IMS network 106 handles the session on behalf of terminal B, and the two IMS networks 104 and 106 may be controlled by different operators. Alternatively, two communicating terminals may of course be connected to the same access network and/or may belong to the same IMS network. Terminal A may also communicate with a server instead, e.g. for downloading some media from a content provider. Moreover, if a terminal is roaming in a visited access network, multimedia services are handled by the terminal's "home" IMS network, i.e. where it is registered as a subscriber.

The session S shown in FIG. 1 is managed by specific nodes in each IMS network, here generally referred to as "session managing nodes" 108. These nodes typically include S-CSCF (Serving Call Session Control Function), I-CSCF (Interrogating Call Session Control Function) and P-CSCF (Proxy Call Session Control Function). Each IMS network 104,106 also includes one or more application servers 110 for enabling various multimedia services. Further, a main database element HSS (Home Subscriber Server) 112 stores subscriber and authentication data as well as service information, among other things. IMS network 106 is basically similar to network 104. The various specific functions of the shown network elements 108-112 are generally known in the art, but are not necessary to describe here further to understand the context of the present invention. Of course, the IMS networks 104,106 contain numerous other nodes and functions not shown here for the sake of simplicity.

A specification called "SIP" (Session Initiation Protocol, according to the standard IETF RFC 3261) is used for handling sessions in IMS networks. SIP is an application-layer control protocol for signalling, to create and generally handle sessions over a packet-switched logic. The SIP standard can thus be used by IMS systems and terminals to establish and control IP multimedia communications. SIP itself does not provide multimedia services, but rather makes available a set of primitives that other protocols or applications can use to actually implement such services. For example, a message called "INVITE" is defined in SIP to initiate a session during a set-up procedure, when a certain application has been invoked.

In SIP, an additional protocol is used called "Session Description Protocol SDP", for describing multimedia sessions, which can be embedded as a self-contained body within SIP messages. SDP can thus be used by terminals to provide information regarding their specific capabilities and preferences, in order to negotiate and agree on which session parameters, in particular codecs as well as an IP address and port for media, to use during a forthcoming multimedia session, as is well-known in the art. The above-mentioned SIP INVITE message includes the SDP with information on one or more required codecs (coders/decoders) and other communication parameters needed for the forthcoming session.

According to 3GPP, it is required that a subscribing communication terminal accessing an IMS network has access to an IMS SIM or "ISIM" (IMS Subscriber Identity Module) application, in order to provide necessary authentication and subscriber data to an operator of the IMS network. Today, only IMS enabled terminals are allowed to access an IMS network.

An ISIM application is typically installed on a Universal Integrated Circuit Card (UICC), analogous to the well-known SIM card for GSM terminals. Terminals equipped with ISIM are referred to as "IMS enabled" terminals. Among other things, an ISIM stores an IMS Private Identity referred to as "IMPI" and at least one IMS Public Identity referred to as "IMPU", which are both known to the IMS network. IMPI is used for authentication and is not to be disclosed to third parties, whereas IMPU can be used by anyone to identify subscribers and/or their equipment when participating in IMS services, as analogous to an e-mail address or a telephone number. The intention is that each IMPU is associated with an IMS service profile.

While the IMS concept was primarily conceived to enable multimedia services for mobile IP terminals, it can be used regardless of access technology, as mentioned above. In the European Telecommunications Standards Institute (ETSI), a working group called TISPAN (Telecom and Internet Services and Protocols for Advanced Networks) is currently working with the adoption of IMS in fixed networks. It is now also desirable to provide such IMS-based services for a variety of IP terminals connected to a local or private network, particularly a residential or office network environment using, e.g., conventional LAN (Local Area Network) equipment and protocols. The generic term "private network" will be used in the following description to represent any such networks, including LAN, WAN (Wide Area Network) and WLAN (Wireless Local Area Network). Further, the term "device" will be used for any terminal in the private network capable of IP communication.

A private network may include fixed or wireless communication devices that are not IMS enabled, even though they may be "SIP enabled", while other communication devices in the private network may be neither IMS enabled nor SIP enabled. For example, such plain devices may include fixed and cordless telephones, as well as PC's and so-called STB's (Set Top Boxes) for television sets. The large amount of such existing "home devices" makes it desirable to provide for an inter-working solution between non-IMS devices and the IMS network, to enhance the market for multimedia services.

In order to provide IMS services to non-IMS enabled communication devices, e.g. connected to a private residential or office network, a multimedia gateway referred to as a "Home IMS Gateway HIG", has been defined that can act as an IMS enabled terminal on behalf of any communication device connected thereto. This type of Home IMS Gateway is described in applicant's earlier patent application PCT/EP2005/055248. Among other things, the HIG includes a SIP "Back-to-Back User Agent" (B2BUA) for interworking between SIP enabled but non-IMS enabled devices and the IMS network. The B2BUA is equipped with an ISIM application and handles IMS signalling on behalf of SIP devices, such that all signalling concerning an SIP device is associated with the corresponding IMPI on the ISIM application. For example, an SIP enabled device may send an SIP REGISTER message to the HIG, containing only an SIP identity. The HIG will then translate the message into an IMS REGISTER message that contains both an IMPI and an IMPU, according to regular IMS procedures.

A typical scenario for using a HIG is generally outlined in FIG. 2, illustrating a private or "home" environment 200, such as a family residence or an office, that contains a plurality of different communication devices linked together in a private network 202. As illustrated here, these devices may include a wireline telephone, a cordless telephone, a TV set, a server and a PC, and these will be simply referred to as "devices" hereafter.

The private network 202 includes a conventional residential gateway RGW 204 which is connected to an external access network 206, providing a communication link for media M to and from the devices in network 202. Although not specifically illustrated here, the RGW 204 typically includes NAT (Network Address Translation) and firewall functions, and also a local DHCP (Dynamic Host Configuration Protocol) server providing private IP addresses to the devices, as is well-known in the art.

The private network 202 further includes an HIG 208 providing a connection to an IMS network, here illustrated as an IMS core 210 containing an HSS 212, among other things. The HIG 208 is equipped with interfaces towards the different types of devices for signalling, using device-specific protocols. In the patent application PCT/EP2005/055248, the basic functional architecture of HIG, including various interfaces, protocol translation and gateway functions, is described in detail. However, these configuration specifics are not necessary to describe here further in order to understand the present invention.

In practice, the described HIG functionality may be implemented as a separate node, or in an RGW, or even in an IMS enabled terminal. When the HIG 208 is implemented as a standalone node connected to the private network 202, signalling to/from the IMS network 210 is actually also routed through the RGW 204. Although the HIG is shown here as a unit separated from RGW, it typically operates "behind" the RGW and terminates the signalling traffic, as indicated by dashed lines in the figure. However, for simplicity, the HIG will generally be considered as a separate functional unit in the following description, regardless of implementation.

In the HIG 208, identity information 214 is stored for each of the devices in the network 202, typically including the above-mentioned IMPU, which is valid for accessing the IMS core 210 where the same identity information is also stored as subscriber information 216 in the HSS 212, as indicated in the figure. The patent application PCT/EP2005/055248 outlines how different combinations of IMPI and IMPU can be used in this context. Thus, each device in network 202 has been assigned a valid IMS identity, e.g. including an IMPU, which is associated with its local IP address. The identity information 214 is typically stored in an ISIM application implemented in the HIG 208.

Thus, when a device in network 202 sends a request for a multimedia service, using a protocol within its capability, the HIG 208 identifies the device by means of its local IP address, and retrieves the IMS identity 214 associated with that device. Then, the HIG can translate the received service request and create a valid SIP-based IMS request (e.g. SIP INVITE) on behalf of the device, using the retrieved IMS identity 214. HIG 208 will then set up a session for the device by communicating suitable SIP messages with the IMS core 210, accordingly.

In a similar manner, an incoming call involving an IMS service, that may be addressed to one of the devices or generally to the private home or office, can be set up by the HIG on behalf of a device using an IMS identity 214 associated with the device. The call can then be routed to the called device over the RGW 204 to communicate media M. In this way, the IMS core will perceive the device in network 202 as an IMS enabled device, and the device will use the HIG 208 as a proxy for accessing services offered by means of the IMS network.

However, this procedure implies that a valid IMS identity must be assigned in the HIG for each device in the private network 202. The IMS network operator typically hands out IMS identities which also must be registered in the IMS network as subscriber information stored in the HSS 212. Each time a device is added to the network, a new IMS identity must be assigned thereto. Consequently, the IMS identity setup at both locations 208, 212 must be modified each time a device is added or removed from the local environment, i.e. the private network 202.

This somewhat inflexible solution places an unwanted administration burden on the user as well as the IMS operator, and it is not evident how a user should handle the IMS identities, e.g. IMPU's. Moreover, the IMS network may become loaded with numerous IMS identities and corresponding subscriptions that must be managed, e.g. for authentication. A more flexible and convenient solution is thus desirable for providing access to IMS services for non-IMS enabled devices.

SUMMARY

It is an object of the present invention to address at least some of the problems outlined above. More specifically, it is an object of the present invention to make it possible to avoid management of specific public identities for each device in a private network, when providing access to multimedia services.

These objects and others can be obtained by providing a method and an arrangement in a multimedia service gateway according to the independent claims attached below.

According to one aspect, the present invention encompasses a method of providing access to multimedia services for communication devices connected to a private network, by means of a multimedia gateway connected to a multimedia service network. When a request is received from a device in the private network for a public identity associated with the multimedia gateway, an associated public identity is selected and allocated to said device from a pool of public identities associated with the multimedia gateway which have been predefined as valid in the multimedia service network. Then, the device is registered by activating the allocated associated public identity in the multimedia service network, thereby enabling the multimedia gateway to establish a multimedia session on behalf of said device, using said allocated associated public identity.

The associated public identities in the pool may include temporary identities for use by any devices and/or users in the private network, and personal identities reserved for use by specific devices and/or users in the private network. If a personal associated public identity is required, a specific associated public identity reserved for said device and/or its user may be selected, whereas if no personal associated public identity is required, any available temporary associated public identity may be selected.

In the inventive method, the received identity request may indicate whether a personal or temporary associated public identity is desired. Alternatively, a personal associated public identity may be automatically required when the identity request was received from a particular device or user. The associated public identities in the pool may have been predefined in the multimedia service network for different service profiles with respect to any of: service access limitations, bandwidth priorities, QoS control, parental control, pricing negotiations, identity of calling/called party, black listing, and security enforcement.

In the inventive method, the received identity request may be a specifically adapted message defined in said device as an explicit request for an associated public identity. If the device is an SIP enabled device, the received identity request may be either a specifically adapted SIP message, or a regular SIP request message for a multimedia service interpreted as an implicit request for an associated public identity.

The selected associated public identity may be saved together with identity information on said device in a session database. The device identity entered in the session database for the device may include an internal identity code and/or a local IP address of the device.

Selecting and allocating an associated public identity from the pool may include identifying the requesting device and/or user and applying predetermined allocation rules or policies to the request, based on the identified device and/or user.

The multimedia service network may be an IMS network and the associated public identities in the pool may be IMPU's. The inventive method may be executed in a separate node, or in an RGW, or in an IMS enabled terminal in the private network, depending on the implementation of the multimedia gateway.

According to another aspect, the present invention further encompasses an arrangement in a multimedia gateway connected to a multimedia service network, for providing access to multimedia services for communication devices connected to a private network. The inventive arrangement basically comprises a communication unit and an identity manager. The communication unit is adapted to receive a request from a device in the private network for a public identity associated with the multimedia gateway. The identity manager is adapted to select and allocate to said device, an associated public identity from a pool of public identities associated with the multimedia gateway which have been predefined as valid in the multimedia service network. The communication unit is further adapted to register the device by activating the allocated associated public identity in the multimedia service network, thereby enabling the multimedia gateway to establish a multimedia session on behalf of said device, using said allocated associated public identity.

In the inventive arrangement, the associated public identities in the pool may include temporary identities for use by any devices and/or users in the private network, and personal identities reserved for use by specific devices and/or users in the private network. If a personal associated public identity is required, the identity manager may be further adapted to select a specific associated public identity reserved for said device and/or its user. On the other hand, if no personal associated public identity is required, the identity manager may be further adapted to select any available temporary associated public identity.

In the inventive arrangement, the received identity request may indicate whether a personal or temporary associated public identity is desired. Alternatively, a personal associated public identity may be automatically required when the received identity request was received from a particular device or user.

In the inventive arrangement, the associated public identities in the pool may have been predefined in the multimedia service network for different service profiles with respect to any of: service access limitations, bandwidth priorities, QoS control, parental control, pricing negotiations, identity of calling/called party, black listing, and security enforcement.

In the inventive arrangement, the received identity request may be a specifically adapted message defined in the device as an explicit request for an associated public identity. If the device is a SIP enabled device, the received identity request may be a specifically adapted SIP message or a regular SIP request message for a multimedia service, interpreted as an implicit request for an associated public identity.

The identity manager may be further adapted to save the selected associated public identity together with identity information on said device in a session database. The device identity entered in the session database for the device may include an internal identity code and/or a local IP address of the device.

The identity manager may be further adapted to identify the requesting device and/or user, and apply predetermined allocation rules or policies to the request, based on the identified device and/or user.

In the inventive arrangement, the multimedia service network may be an IMS network and the associated public identities in the pool may be IMPU's. The inventive arrangement in the multimedia gateway may be implemented in a separate node, or in an RGW, or in an IMS enabled terminal in the private network.

Further possible features and benefits of the present invention will be explained in the detailed description below.

BRIEF DESCRIPTION OF THE DRAWINGS

The present invention will now be described in more detail by means of preferred embodiments and with reference to the accompanying drawings, in which.

DESCRIPTION OF PREFERRED EMBODIMENTS

Figure 1:
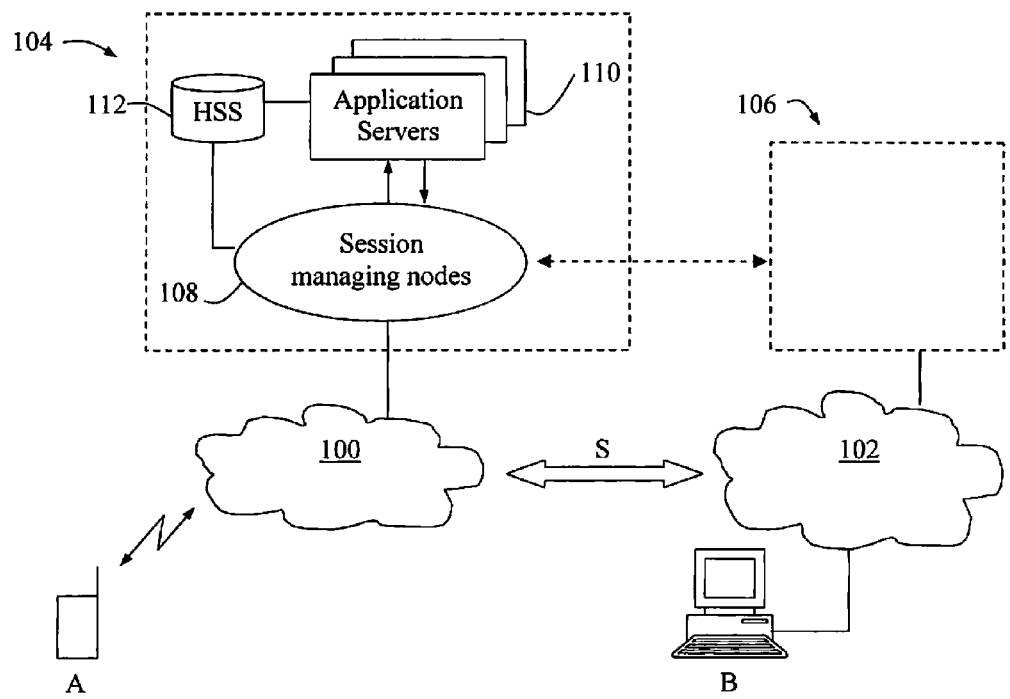
FIG. 1 is a schematic view of a conventional network structure for communicating multimedia between two communication terminals, according to the prior art.

Briefly described, the present invention enables multimedia communication for any multimedia-capable communication device connected to a private network, by means of a plurality of public identities associated with a multimedia gateway, hereafter referred to as "associated public identities", the multimedia gateway being defined as a subscriber in a multimedia service network. The associated public identities in the multimedia gateway may be either "temporary" or "personal", here implying that temporary identities can be used more or less randomly by any devices and/or users in the private network, whereas personal identities are reserved for specific devices and/or users in the private network. Thus, the temporary identities are shared by all devices and users in the private network, although a temporary identity can of course be used by only one device at a time.

All the associated public identities are predefined as valid in the multimedia service network, and may be used as a "pool" of associated public identities in the multimedia gateway. Thus, associated public identities may be selected from the pool and allocated to devices desiring to access multimedia services.

When providing access to multimedia services for a specific device and/or person by means of an associated public identity selected from the pool, that device/person will not be known to the multimedia service network which will only "see" the multimedia gateway as a subscriber. Thereby, privacy and anonymity can be preserved, and the behaviour of that particular device/person cannot be detected.

Thus, in response to an identity request from a device in the private network, an associated public identity is selected from the associated public identity pool for temporary assignment to that device. The selected associated public identity is also registered in the service network as valid for an (unknown) active device behind the multimedia gateway. The activated associated public identity can then be used by the multimedia gateway for accessing the service network on behalf of the device in the private network. The service network is typically an IMS network and the associated public identities are typically IMPU's.

By using a pool of associated public identities for a plurality of devices connected to the private network, it is not necessary to have a fixed specific individual public identity for each device to obtain access to multimedia services. Thereby, it is sufficient to define the multimedia gateway as a subscriber with the multimedia service network, including its associated public identities, to cater for plural devices in the private network, which will reduce the number of subscriptions in the service network. Moreover, it is possible to allow a visiting device temporarily attached to the private network, to access the multimedia services by assigning an associated public identity thereto. The true identity of the device will also be hidden behind the multimedia gateway, thereby providing for privacy. Further advantages will become apparent in the following detailed description of embodiments of the present invention.

In this description, the multimedia gateway will be referred to as an HIG (Home IMS Gateway) connected to an IMS (IP Multimedia Subsystem) network. However, the present invention is basically not limited to these specific terms, nor to any specific protocols and standards referred to in the following.

Figure 2:
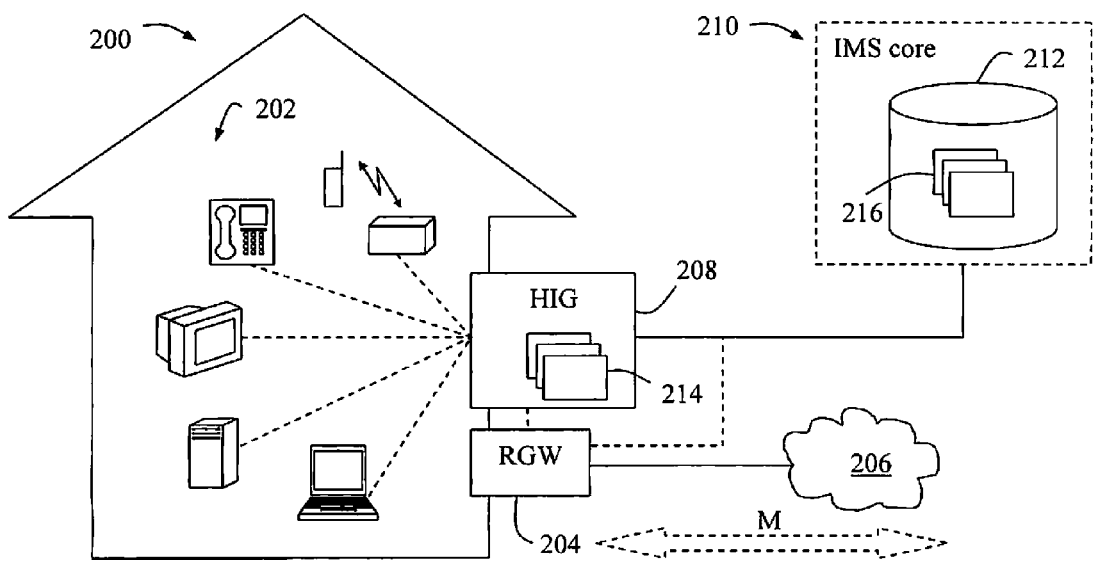
FIG. 2 is a schematic view of a residential network with access to multimedia services by means of a local multimedia gateway or "Home IMS Gateway HIG".
Figure 3:
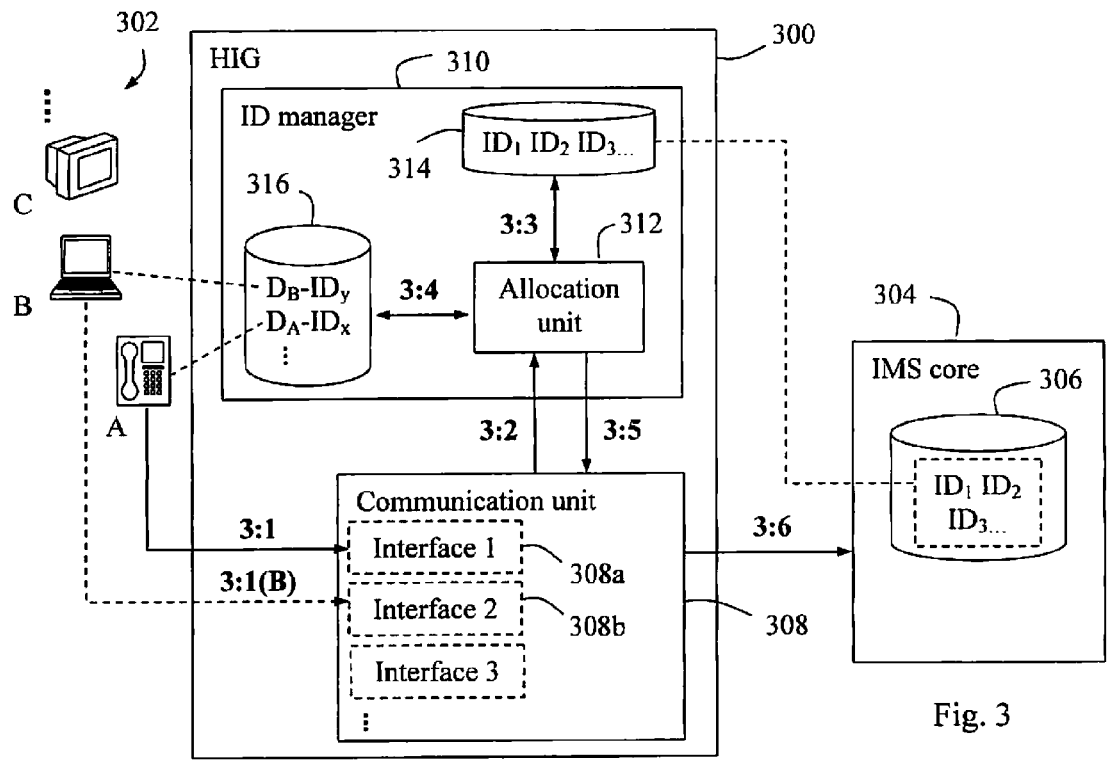
FIG. 3 is a block diagram including a multimedia gateway or HIG when used for assigning an associated public identity to a device, in accordance with one embodiment.

FIG. 3 illustrates a multimedia gateway or HIG 300 when used for allocating an associated public identity, such as IMPU, in accordance with one embodiment. Similar to FIG. 2, the HIG 300 is a gateway between a plurality of devices 302 in a private network and a multimedia service network, here indicated as an IMS core 304 in which an HSS 306 contains subscriber information. As described above, the HIG 300 may be implemented as a separate node, in an RGW (not shown), or in an IMS enabled terminal (not shown).

It is assumed that the shown devices 302 are non-IMS enabled, just as described above for FIG. 2, although the present invention does not exclude the use of IMS enabled devices as well. In this example, a telephone A, a PC B and a television set C are shown. The HIG 300 is provided with suitable communication protocols and interfaces adapted to the connected devices, each typically including both a hardware interface and a software interface, e.g. with protocol adapters (not shown here) for protocol translation, if needed. In the case of non-SIP devices, protocol adapters may be used for UPnP (Universal Plug-and-Play) or H.323, etc.

The HIG 300 comprises a communication unit 308 connected to the devices 302, and an identity manager 310 configured to handle the assignment of associated public identities to devices, to be described in more detail later below. The identity manager 310 could be referred to as a "Dynamic IMPU Assignment Service, DIAS" when IMPU is used as a valid associated public identity in the IMS network, although the more generic term "ID manager" will be used in this description hereafter.

The ID manager 310 includes an allocation unit 312 for allocating associated public identities, a database or pool 314 with available associated public identities, hereafter referred to as ID pool, and a session database 316 for holding session information including combinations of devices and their assigned associated public identities. The ID pool 316 thus contains a plurality of temporary or personal associated public identities $ID_1, ID_2, ID_3, \ldots$ that can be selected for device assignment. These associated public identities are known and predefined in the IMS network 304, and are stored as subscriber data in the HSS 306, as indicated by the dashed box therein and the dashed connection line to the pool 314.

The associated public identities in the pool 314 may be predefined in the IMS network for different service profiles with respect to, e.g., certain service access limitations, bandwidth priorities, QoS control, parental control, pricing negotiations, identity of calling/called party, black listing, security enforcement, etc. Thereby, the identities can be allocated "intelligently" depending on, e.g., various rules or policies defined in the private network for different devices and/or users.

In this example, communication unit 308 is shown having a plurality of different communication interfaces 1,2,3 . . . towards the devices 302, including a first interface 308a adapted for non-SIP enabled terminals, and a second interface 308b adapted for SIP enabled terminals. As mentioned above, each interface includes a hardware interface and a software interface. Referring to FIG. 3, a procedure will now be described for allocating associated public identities to devices 302 in the private network. It is assumed that device A is a non-SIP enabled terminal and connected to the first interface 308a, whereas device B is an SIP enabled terminal and connected to the second interface 308b. The interfaces 308a, 308b may be entered at different ports in the communication unit 308.

In a first step 3:1, a request for an associated public identity is received in communication unit 308 from device A over the first interface 308a. This identity request is a specifically adapted new message defined in device A as an explicit request for a valid associated public identity, in order to gain access to multimedia services from the IMS network 304. It may be required that the device A is authenticated in the HIG at this point, which however lies outside the scope of the present invention and is therefore not necessary to describe here further.

In a shown alternative first step 3:1(B), a request for an associated public identity may be received from device B instead over the second interface 308b. Being an SIP enabled terminal, this identity request may be a regular SIP request message for some multimedia service, and not an explicit request for a valid associated public identity as in the former case. In this context however, this message can be interpreted by the ID manager 310 as an implicit request for a valid associated public identity, in order to gain access to multimedia services from the IMS network 304. Thereby, it is not necessary to define and implement any new message to this effect for SIP enabled devices connected to the second interface 308b. Alternatively, device B may be configured to send a specifically adapted new SIP message as an explicit request for a valid associated public identity.

In either case, reception of this (explicit or implicit) request of step 3:1 or 3:1(B) results in that communication unit 308 sends a suitable internal trigger message to the allocation unit 312, in a step 3:2, triggering allocation of an associated public identity for device A (or B). In response thereto, allocation unit 312 selects a suitable valid associated public identity from the identity pool 314, in a further step 3:3. As mentioned above, associated public identities can be allocated "intelligently" which may be dictated by predetermined rules or policies for different devices and/or users. Thus, the allocation unit may apply a predetermined allocation algorithm or the like implementing such rules or policies.

For example, if device A requires a personal associated public identity, a specific associated public identity reserved for that device and/or user is selected, whereas if no personal associated public identity is required, any available temporary associated public identity may be randomly selected. In one embodiment, the user may optionally indicate in the identity request of step 3:1 whether a personal or temporary associated public identity is desired. In the case of SIP devices, an extension of SIP may be required to implement this option. Alternatively, a personal associated public identity may be automatically required when the request is sent from a particular device or user.

When an associated public identity, e.g. IMPU, has been selected from the identity pool 314 for device A (or B), the selected associated public identity is saved together with identity information on the device A (or B) in the session database 316, in a step 3:4. In the figure, session database 316 indicates that identity $ID_x$ has been allocated to device A and identity $ID_y$ has been allocated to device B. The device identity entered in session database 316 for device A (or B) may include some internal identity code and/or a local IP address of the device.

In a next step 3:5, allocation unit 312 informs communication unit 308 on the allocated associated public identity of device A (or B) by means of a suitable internal message. In response thereto, communication unit 308 sends a registration request to IMS core 304 in a final step 3:6, in order to activate the associated public identity allocated for device a (or B), such that the HIG 300 can obtain multimedia services from IMS core 304 on behalf of device A (or B) using that identity.

Figure 4:
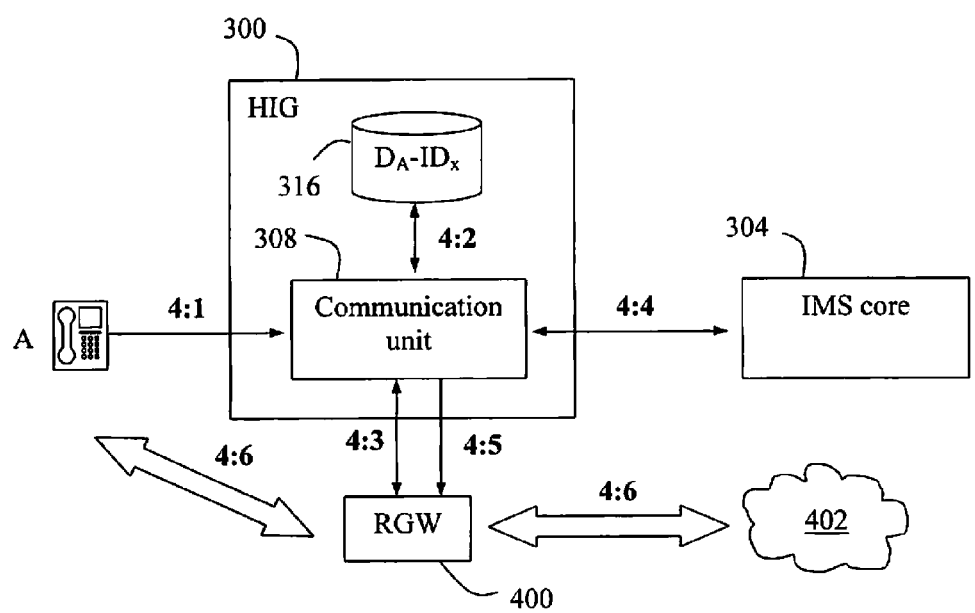
FIG. 4 is a block diagram illustrating the multimedia gateway or HIG shown in FIG. 3 when used for setting up a multimedia session for an outgoing call, in accordance with another embodiment.

Using the scenario and elements outlined in FIG. 3, FIG. 4 illustrates how a multimedia session can be established for device A, in this case being a calling party. The same numerals are used here for corresponding elements. The devices in the private network are further connected to a conventional network gateway, here referred to as a "Residential Gateway RGW" 400, which in turn is connected to an access network 402, for the communication of media. Although not specifically illustrated here, the RGW 204 typically includes NAT (Network Address Translation) and firewall functions, and also a local DHCP (Dynamic Host Configuration Protocol) server providing private IP addresses to the devices, as is well-known in the art.

In the HIG 300, only communication unit 308 and session database 316 are shown, and it is assumed that an associated public identity $ID_x$ has been allocated to device A, as indicated within session database 316. In order to establish multimedia sessions, it may be necessary to use further information on the devices, e.g. regarding their current status, settings and capabilities with respect to multimedia communication, which may also be stored (not shown) in the HIG 300.

In a first step 4:1, communication unit 308 in HIG 300 receives a session request from the device A directed to a remote party (not shown), e.g. an IMS enabled terminal or a content server. The received request is given according to a protocol used by device A over the above-described first interface, not shown here.

In a next step 4:2, communication unit 308 retrieves the associated public identity $ID_x$ allocated for device A from the session database 316. Device capabilities, identity information and local IP address of the device A may also be retrieved at this point.

The communication unit 308 now communicates with the RGW 400 in order to generally establish a communication link for device A, in a next step 4:3. This step may include the reservation of a port opening in the NAT/firewall of RGW 308 for one or more different media streams of the session. The RGW thus provides its public IP address on the access network side and the reserved port which is also associated with the local IP address of device A. This information will further be associated with a Call ID defining the session, to be given during session setup.

The communication unit 308 then sets up a session on behalf of device A towards the IMS core 304, using the retrieved identity $ID_x$, in a next step 4:4. In this step, conventional signalling messages are exchanged with the IMS network, typically according to SIP. For IMS services, the first message in the setup procedure would typically be an SIP INVITE message. Information including the associated public identity $ID_x$ as well as capability data of the device A, if available, may be provided to the IMS core 304 in an SDP message embedded in the SIP INVITE message.

Next, the communication unit 308 requests the RGW 400 to open the reserved port mappings in the NAT, including the finally negotiated parameters such as the remote party's IP address, in a step 4:5. Finally, the session may begin in a step 4:6, and any incoming media can now be mapped by the NAT in the RGW 400 to the local IP address and port of device A. A Call ID given during session setup of step 4:4, is also stored in the HIG 300, for further reference during the session.

Figure 5:
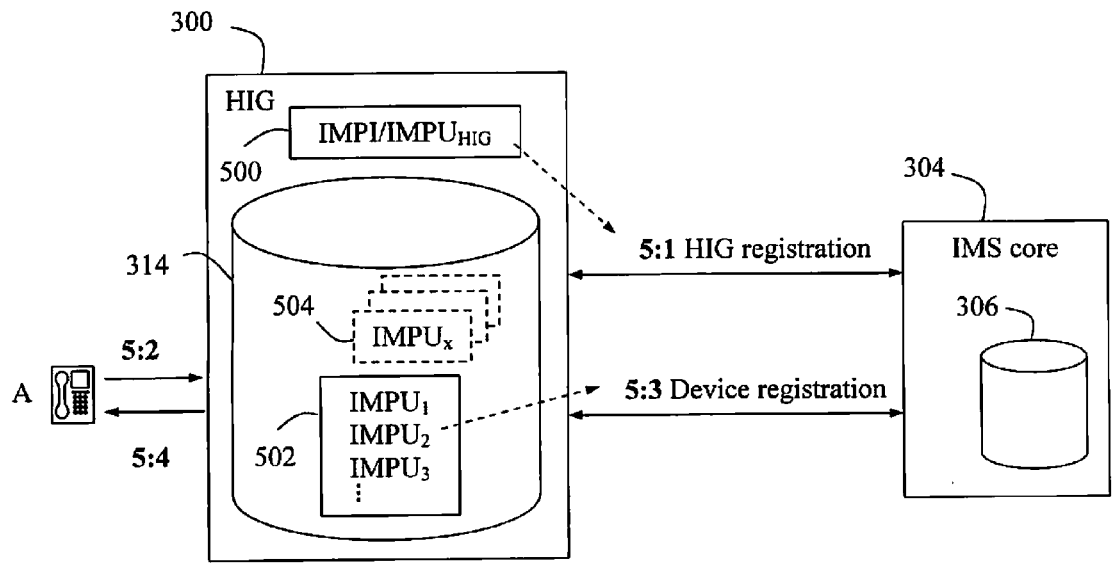
FIG. 5 is a block diagram illustrating the multimedia gateway or HIG shown in FIGS. 3 and 4 when used for registering a device with a multimedia service or IMS network.

FIG. 5 illustrates how valid associated public identities can be implemented in an HIG 300, by means of the above-described IMS Private Identity IMPI and IMS Public Identity IMPU typically used in IMS networks. According to the current standard, the required IMS identity for a subscriber comprises an IMPI and one or more associated IMPU's, but the present invention is generally not limited in this respect. Again, the same numerals indicate corresponding elements as in previous figures. Thus, FIG. 5 shows a device A, an IMS core 304 and an ID pool 314 within the HIG 300.

The HIG 300 has a main IMS identity 500, comprised of a combination of an IMPI and a default IMPU, here indicated as $IMPU_{HIG}$, valid in the IMS core 304 and stored as a subscription in an HSS 306 therein. The HSS further stores subscriber and authentication data, associated with the main IMS identity 500. In addition, a plurality of further IMPU's have been predefined for the subscription that can be used by different devices, which is possible, e.g. as described in the background section for FIG. 2. These further IMPU's are stored in ID pool 314, containing a set of temporary IMPU's 502 and a set of personal IMPU's 504. Different service profiles may have been defined for different IMPU's in the HSS 306, as described above. In this example, $IMPU_2$ has previously been allocated to device A.

Thus, the HIG 300 has been defined in the IMS network 304 as a subscriber equivalent to any IMS-enabled communication terminal, such that the IMS network basically perceives the HIG as a single IMS subscriber. Any non-IMS enabled devices capable of multimedia communication may then use the subscription of the HIG 300, once they are locally registered with the HIG. The subscription of HIG 300 comprises all associated public identities 500, 502 and 504 as being valid in the IMS network. When IMPU's are gradually allocated to different devices in the private network, these IMPU's are registered or "activated" in the IMS core 304, e.g. as follows:

First, when the HIG 300 is powered-on or similar, an HIG registration step 5:1 is performed based on the main IMS identity 500, as schematically indicated by a first dashed arrow. Among other things, the HIG registration involves an authentication procedure e.g. according to some conventional routine. In particular, the IMPI part of the main IMS identity 500 is typically used for authentication of the HIG 300.

Then, in response to receiving a service request from device A as illustrated by a step 5:2, a device registration step 5:3 is performed based on the allocated $IMPU_2$, as schematically indicated by a second dashed arrow. It should be noted that no specific device authentication procedure is necessary during the device registration of step 5:3, since the authority of HIG 300 is utilised, as established in the earlier step 5:1. However, the IMS network may request a re-authentication of HIG during a device registration, but that would be terminated in HIG, making any re-authentications transparent to the device A. Thereby, HIG 300 can establish a multimedia session on behalf of device A, schematically indicated by a following step 5:4, e.g. as described above for FIG. 4.

Figure 6:
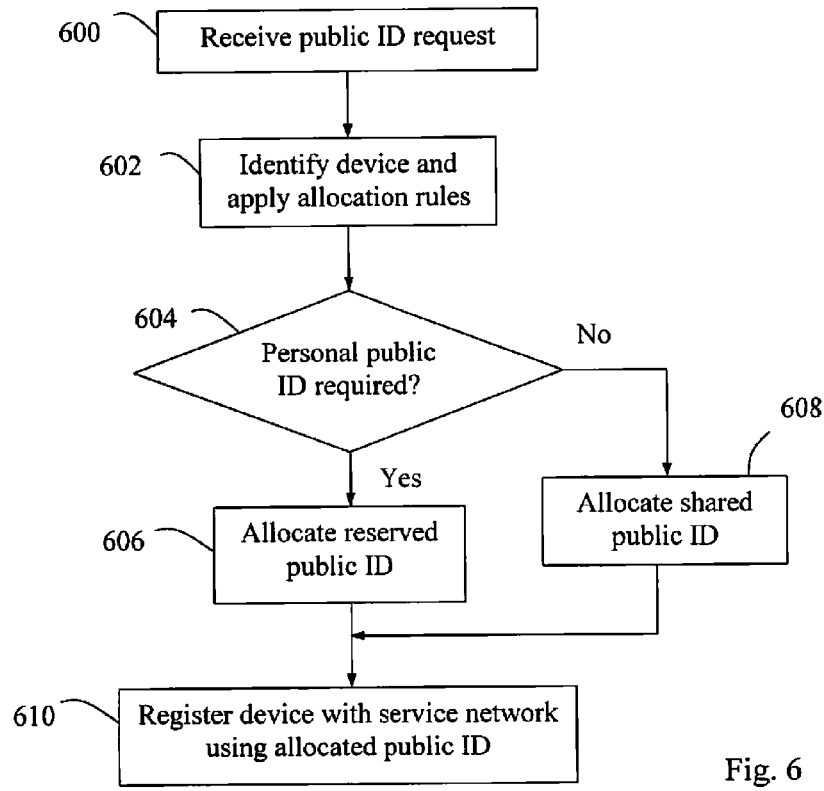
FIG. 6 is a flow chart with steps in a procedure for assigning an associated public identity to a device, in accordance with another embodiment.

FIG. 6 is a flow chart illustrating different steps for allocating an associated public identity to a device in a private network, using an identity manager in a multimedia gateway, in order to provide access to a multimedia service network (typically an IMS network). The illustrated procedure is generally executed in the identity manager, such as the ID manager 310 described for FIG. 3 above, and may be performed in a separate node, or in an RGW, or in an IMS enabled terminal in the private network, depending on the implementation of the multimedia gateway. It is assumed that a plurality of associated public identities, e.g. IMPU's, have been defined for the multimedia gateway in the multimedia service network, including reserved and temporary identities, which are valid in the multimedia service network.

In a first step 600, a request for a valid associated public identity is received from a device in the private network, which may be either an explicit or implicit request as described above. In a next step 602, the requesting device and/or user is identified and predetermined allocation rules or policies are applied to the request, based on the identified device and/or user.

In a next step 604, it is determined whether the device or user requires a personal associated public identity or not. As mentioned above, it may be up to the user to request for a personal or temporary associated public identity, or the type of identity may be selected automatically, depending on the implementation. If a personal identity is required, an associated public identity is selected for allocation in step 606 that has been reserved for the requesting device and/or user. If not, one of the temporary associated public identities is selected for allocation in step 608.

In a final step 610, the device is registered with the service network using the allocated associated public identity, just as in step 5:3 of FIG. 5.

As compared to using of a HIG as described in the background section, the present invention provides for great flexibility in the allocation of associated public identities for any devices capable of multimedia communication in a private network, optionally based on predefined rules or policies. The present invention may result in a reduced number of associated public identities, IMPU's in particular, that must be defined for terminals in the multimedia service network, since identities from an ID pool can be reused for different users and/or devices. The network operator will thus benefit from the management of fewer public identities, such as IMPU's, and its associated subscriber and authentication data.

Further benefits may include increased privacy, since devices using public identities associated with the multimedia gateway will not be discernable to others outside the private network. In other words, neither the network operator nor other users can detect individual device identities and their properties and activities. The efforts for manual configuration, including registration of devices in the multimedia service network, can also be minimised. A user can thus create a private network with "hidden" devices using associated public identities, which are not necessary to register individually in the multimedia service network for specified devices.

It is further possible to introduce temporary visitors in the private network, without involving the multimedia service network, which then can obtain access to multimedia services offered by the multimedia service network, using the HIG and its associated public identities. Thus, it is entirely up to the private network user if a visiting device should be allowed to access the multimedia services in this way.

While the invention has been described with reference to specific exemplary embodiments, the description is in general only intended to illustrate the inventive concept and should not be taken as limiting the scope of the invention. For example, the concepts of IMS and HIG have been used throughout when describing the above embodiments, although any other standards and network elements for enabling multimedia communication may basically be used. The present invention is defined by the appended claims.

The invention claimed is:

1. A method of providing access to multimedia services for communication devices connected to a private network, by means of a multimedia gateway connected to a multimedia service network, comprising the following steps:
   receiving, using a processor, a request from a device in the private network for a public identity associated with the multimedia gateway,
   selecting and allocating, using the processor, to said device at least one associated public identity from a pool of public identities associated with the multimedia gateway which have been predefined as valid in the multimedia service network, wherein the multimedia service network is an IMS network, the at least one associated public identity comprises an IP Multimedia Public Identity (IMPU), and allocating the at least one associated public identity comprises assigning at least one temporary IMPU from the pool to the device, and
   registering, using the processor, the device by activating the allocated associated public identity in the multimedia service network, thereby enabling the multimedia gateway to establish a multimedia session on behalf of said device, using said allocated associated public identity.

2. A method according to claim 1, wherein the associated public identities in said pool include temporary identities for use by any devices and/or users in the private network, and personal identities reserved for use by specific devices and/or users in the private network.

3. A method according to claim 2, wherein if a personal associated public identity is required, a specific associated public identity reserved for said device and/or its user is selected, whereas if no personal associated public identity is required, any available temporary associated public identity is selected.

4. A method according to claim 2, wherein said received identity request indicates whether a personal or temporary associated public identity is desired.

5. A method according to claim 2, wherein a personal associated public identity is automatically required when said identity request was received from a particular device or user.

6. A method according to claim 1, wherein the associated public identities in the pool have been predefined in the multimedia service network for different service profiles with respect to any of: service access limitations, bandwidth priorities, QoS control, parental control, pricing negotiations, identity of calling/called party, black listing, and security enforcement.

7. A method according to claim 1, wherein the received identity request is a specifically adapted message defined in said device as an explicit request for an associated public identity.

8. A method according to claim 7, wherein said device is a SIP enabled device and the received identity request is a specifically adapted SIP message.

9. A method according to claim 1, wherein said device is an SIP enabled device, and the received identity request is a regular SIP request message for a multimedia service, interpreted as an implicit request for an associated public identity.

10. A method according to claim 1, wherein the selected associated public identity is saved together with identity information on said device in a session database.

11. A method according to claim 10, wherein the device identity entered in the session database for said device includes an internal identity code and/or a local IP address of the device.

12. A method according to claim 1, wherein said selecting and allocating step includes identifying, using the processor, the requesting device and/or user and applying predetermined allocation rules or policies to the request, based on the identified device and/or user.

13. The method according to claim 1, wherein each of the public identities among the pool of public identities are predefined in the multimedia service network for different service profiles.

14. The method according to claim 1, wherein the IMPU is used to identify subscribers when participating in IMS services and is associated with an IMS service profile.

15. A method according to claim 1, performed in a separate node, or in an RGW, or in an IMS enabled terminal in the private network.

16. An arrangement in a multimedia gateway connected to a multimedia service network, for providing access to multimedia services for communication devices connected to a private network, comprising:
   a processor adapted to receive a request from a device in the private network for a public identity associated with the multimedia gateway, and
   processor adapted to select and allocate to said device, at least one associated public identity from a pool of public identities associated with the multimedia gateway which have been predefined as valid in the multimedia service network, wherein the multimedia service network is an IMS network, the at least one associated public identity comprises an IP Multimedia Public Identity (IMPU), and the allocation of the at least one associated public identity comprises assigning at least one temporary IMPU from the pool to the device,
   wherein the processor adapted to receive the request is further adapted to register the device by activating the allocated associated public identity in the multimedia service network, thereby enabling the multimedia gateway to establish a multimedia session on behalf of said device, using said allocated associated public identity.

17. An arrangement according to claim 16, wherein the associated public identities in said pool include temporary identities for use by any devices and/or users in the private network, and personal identities reserved for use by specific devices and/or users in the private network.

18. An arrangement according to claim 17, wherein if a personal associated public identity is required, said processor adapted to select and allocate to said device is further adapted to select a specific associated public identity reserved for said device and/or its user, whereas if no personal associated public identity is required, said identity manager is further adapted to select any available temporary associated public identity.

19. An arrangement according to claim 17, wherein said received identity request indicates whether a personal or temporary associated public identity is desired.

20. An arrangement according to claim 17, wherein a personal associated public identity is automatically required when said received identity request was received from a particular device or user.

21. An arrangement according to claim 16, wherein the associated public identities in the pool have been predefined in the multimedia service network for different service profiles with respect to any of: service access limitations, bandwidth priorities, QoS control, parental control, pricing negotiations, identity of calling/called party, black listing, and security enforcement.

22. An arrangement according to claim 16, wherein the received identity request is a specifically adapted message defined in said device as an explicit request for an associated public identity.

23. An arrangement according to claim 22, wherein said device is a SIP enabled device and the received identity request is a specifically adapted SIP message.

24. An arrangement according to claim 16, wherein said device is an SIP enabled device, and the received identity request is a regular SIP request message for a multimedia service, interpreted as an implicit request for an associated public identity.

25. An arrangement according to claim 16, wherein said processor adapted to select and allocate to said device is further adapted to save the selected associated public identity together with identity information on said device in a session database.

26. An arrangement according to claim 25, wherein the device identity entered in the session database for said device includes an internal identity code and/or a local IP address of the device.

27. An arrangement according to claim 16, wherein said processor adapted to select and allocate to said device is further adapted to identify the requesting device and/or user and apply predetermined allocation rules or policies to the request, based on the identified device and/or user.

28. An arrangement according to claim 16, adapted to be implemented as a separate node, or in an RGW, or in an IMS enabled terminal in the private network.

\* \* \* \* \*

UNITED STATES PATENT AND TRADEMARK OFFICE
CERTIFICATE OF CORRECTION

PATENT NO.        : 9,077,591 B2                                Page 1 of 1
APPLICATION NO.   : 12/097400
DATED             : July 7, 2015
INVENTOR(S)       : Cheng et al.

It is certified that error appears in the above-identified patent and that said Letters Patent is hereby corrected as shown below:

On the title page item [75] under "Inventors", in Column 1, Line 1, delete "Spänga (SE);" and insert -- Spånga (SE); --, therefor.

In the specification

Column 7, Line 21, delete "DESCRIPTION" and insert -- DETAILED DESCRIPTION --, therefor.

Column 8, Line 52, delete "ID pool 316" and insert -- ID pool 314 --, therefor.

Column 10, Line 51, delete "RGW 308" and insert -- RGW 400 --, therefor.

Signed and Sealed this
First Day of December, 2015

Michelle K. Lee
*Director of the United States Patent and Trademark Office*